May 2, 1967

W. F. WRIGHT 3,316,954

TIRE STRUCTURE

Filed June 14, 1965

INVENTOR.
WINSTON F. WRIGHT
BY
ATTORNEY

United States Patent Office 3,316,954
Patented May 2, 1967

1

3,316,954
TIRE STRUCTURE
Winston F. Wright, Winnemucca, Nev.
(113 N. 13th St., House A, Las Vegas, Nev. 89101)
Filed June 14, 1965, Ser. No. 463,564
3 Claims. (Cl. 152—352)

This invention pertains to a tire structure for motor vehicles.

One of the objects of this invention is to provide a tire adapted for use on hard surface roads and back country mud, rocks nad sand with equal facility.

Still another object of this invention is to provide a tire structure in which tread ground contact surface area accommodates itself automatically to the nature of the ground surface over which the vehicleis being operated.

It is also an object of this invention to provide a tire structure having substantially flat angularly disposed side walls adjacent a normal hard surface road tread which automatically come into load carrying surface contacting play in soft mud, sand and the like.

And still another object of this invention is to provide a tire structure having angularly disposed substantially flat side walls V which deflect inwardly with increasing loads applied to the tire.

Further features and advantages of this invention will appear from a detailed description of the drawings in which.

Figure 1:
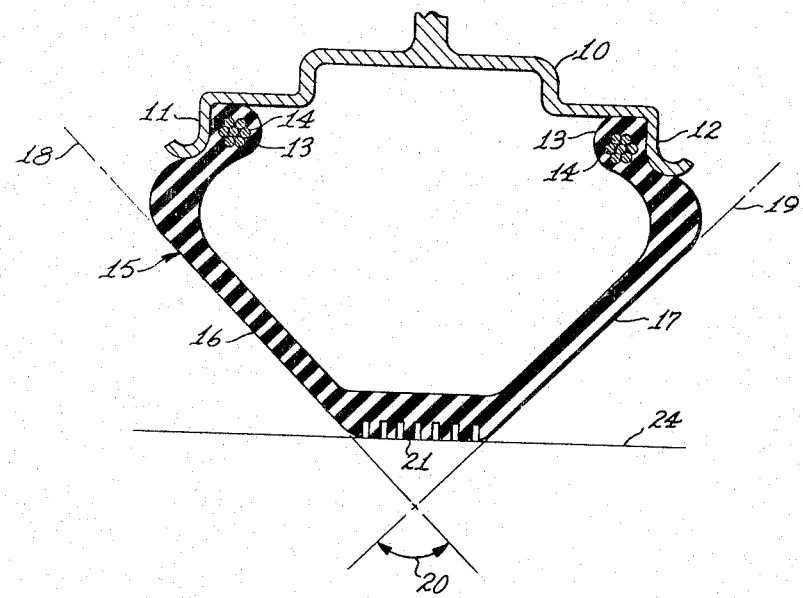
FIG. 1 is a radial section through an improved tire structure incorporating the features of this invention.

As an example of one embodiment of this invention, there is shown a tire structure comprising a tire support rim 10 of a vehicle wheel preferably of relatively wide construction between the flange portions 11 and 12. The tire 15 has the usual beads 13 reinforced with suitable wire 14 or the like.

Extending outwardly from the beads 13 are the angularly disposed side walls 16 and 17 lying in cones defined by the lines 18 and 19 which intersect at substantially a right angle 20. The outer portions of the side walls terminate at the side of a narrow hard surface tire tread 21, FIG. 1.

Figure 2:
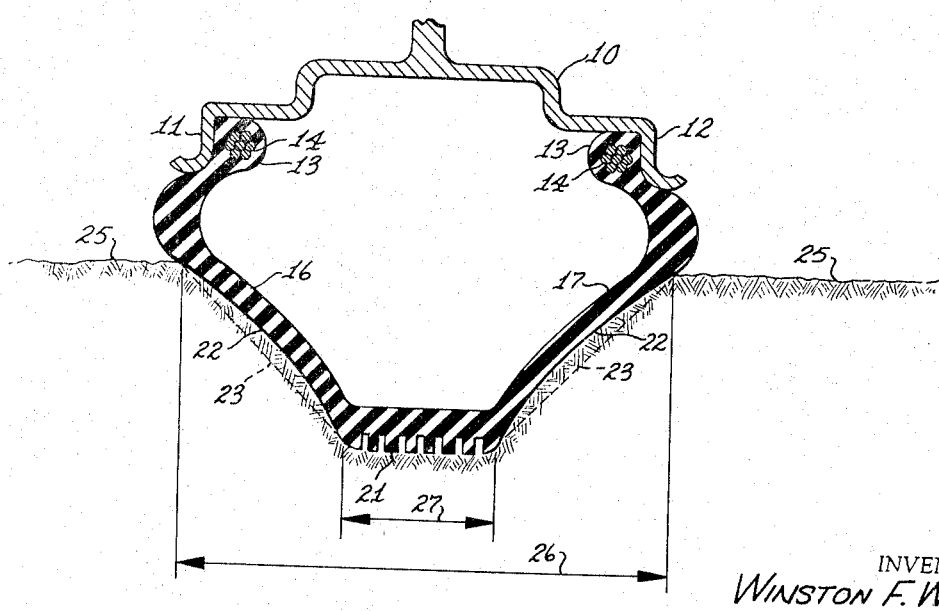
FIG. 2 is a sectional view similar to FIG. 1 but showing the tire in loaded conditions on various types of surfaces.

The side walls are so constructed that when load is applied on the wheel and rim 10 the side walls deflect inwardly at 22, FIG. 2, from the broken line position 23 when operating on the normal hard road surface 24. Because of this structure the side walls automatically provide increasing tread support area 26 over the area 27 of the tread 21 in soft mud and sand surfaces 25. The softer the surface 25 the further up the sides 16 and 17 becomes the tread support area 26 of the tire. Further, the V-shaped side tread surfaces 18 and 19 cause a true wedging action for greater traction and pulling power in soft surfaces 25.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

What is claimed is:

1. A tire structure comprising in combination:
   (A) angularly disposed substantially flat side walls,
   (B) a normal hardsurface relatively narrow road tread formed integral with the outer portions of said flat side walls,
   (C) said side wall portions being constructed that the inner sidewall portions extend beyond the width of the rim so as to cause inward deflection of the side walls as load is applied to said tire.

2. A tire structure as set forth in claim 1 wherein there are:
   (A) angularly disposed substantially conical side portions located at right angles to each other,
   (B) a hard surface tread formed at the outer periphery of said side portions,
   (C) beads formed laterally inwardly of the inner portions of said sides,
   (D) and a relatively wide rim having flanges supportingly engaging said beads inwardly of the widest portion of the tire side walls.

3. A tire structure as set forth in claim 1 wherein there are:
   (A) angularly disposed sides forming a V-shaped cross-section for said tire whose inner portions extend laterally beyond the width of the rim flanges,
   (B) and a narrow hard surface road tread formed at the bottom of said V-shaped cross section.

References Cited by the Examiner

UNITED STATES PATENTS

| | | | |
|---|---|---|---|
| 716,099 | 12/1902 | Polack | 152—352 |
| 1,098,017 | 5/1914 | Clune | 152—352 X |
| 2,005,627 | 6/1935 | Maranville | 152—352 X |

ARTHUR L. LA POINT, *Primary Examiner.*

C. W. HAEFELE, *Assistant Examiner.*